Figure 1:
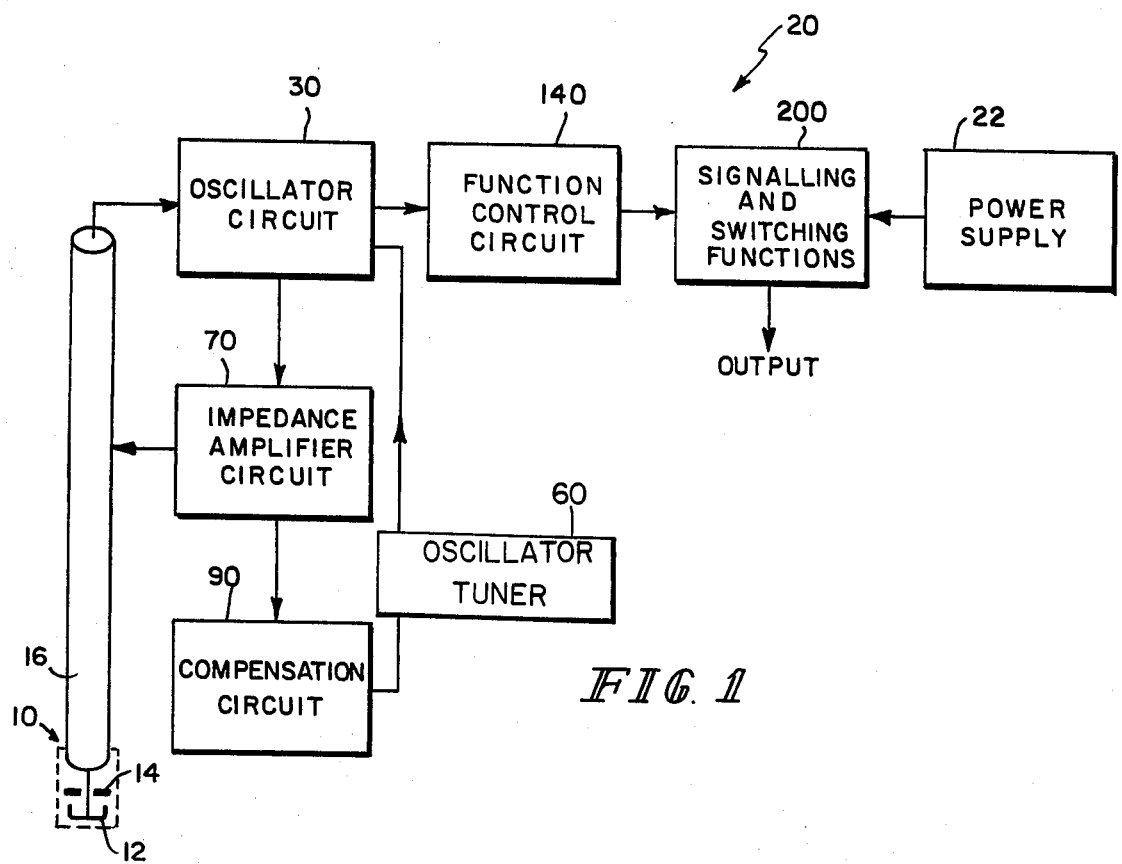

United States Patent [19]

Geiger

[11] 4,347,741

[45] Sep. 7, 1982

[54] CONTROL SYSTEM FOR A CAPACITIVE LEVEL SENSOR

[75] Inventor: Wolfgang Geiger, Greenwood, Ind.

[73] Assignee: Endress & Hauser, Inc., Greenwood, Ind.

[21] Appl. No.: 169,835

[22] Filed: Jul. 17, 1980

[51] Int. Cl.³ ............................ G01F 23/26; H03J 1/02
[52] U.S. Cl. ................................ 73/304 C; 324/61 P; 331/65; 361/272
[58] Field of Search ...................... 73/304 C; 361/272; 340/507, 620

[56] References Cited

U.S. PATENT DOCUMENTS

| | | | |
|---|---|---|---|
| 3,119,266 | 1/1964 | Atkinson | 73/290 R X |
| 3,706,980 | 12/1972 | Maltby | 324/61 R X |
| 3,781,672 | 12/1973 | Maltby et al. | 73/304 C X |
| 3,879,644 | 4/1975 | Maltby | 73/304 C X |
| 3,918,306 | 11/1975 | Maltby | 73/304 C |
| 4,145,927 | 3/1979 | Larson | 73/304 C |
| 4,146,834 | 3/1979 | Maltby et al. | 324/57 R X |
| 4,208,909 | 6/1980 | Maltby et al. | 73/304 C |

Primary Examiner—Daniel M. Yasich
Attorney, Agent, or Firm—Jenkins, Coffey, Hyland, Badger & Conard

[57] ABSTRACT

A capacitive system for sensing the level of material includes a conductive member electrically connected to ground potential, a probe including a sensing element arranged to establish a capacitance between the sensing element and conductive member which is determined by the level of the material and a shielding element interposed between the conductive member and the sensing element to form an electrically neutral zone therebetween to thereby reduce the effect of a conductive buildup of the material on the probe on the capacitance between the conductive member and the sensing element, and a first circuit electrically connected to the sensing and shielding elements for applying generally the same electrical potential to both the sensing and shielding elements, the first circuit having an output which varies in response to a change in the capacitance between the conductive member and the sensing element. A device for measuring an electrical characteristic of the shielding element which is related to the conductivity of the buildup of material on the probe is electrically connected to a second circuit which, through a feedback loop connected to the first circuit, automatically adjusts the sensitivity of the first circuit in response to changes in the electrical characteristic to compensate for a highly conductive buildup of material on the probe.

13 Claims, 2 Drawing Figures

CONTROL SYSTEM FOR A CAPACITIVE LEVEL SENSOR

The present invention relates generally to capacitive level sensors which include a conductive member and a probe including a sensing electrode arranged to establish a capacitance between the sensing electrode and the conductive member which varies in response to changes in the level of a material. More particularly, the present invention relates to a capacitive level sensor which includes a shielding electrode interposed between the sensing electrode and the conductive member to establish an electrically neutral zone therebetween to reduce the effect of a conductive buildup of material on the probe and an improved control system for applying generally the same potential to both the sensing and shielding electrodes to establish the electrically neutral zone therebetween and for detecting the level of the material.

A capacitive level sensor of the same general nature as the sensor of the present invention is disclosed in U.S. Pat. No. 3,119,266. More particularly related to the capacitive level sensor system of the present invention are the systems disclosed in U.S. Pat. Nos. 3,706,980; 3,781,672; 3,879,644; and 4,146,834. Each of these patents discloses a capacitive level sensor system which includes a probe having a sensing electrode and a shielding electrode interposed between the sensing electrode and a conductive member. Further, each of these systems includes an electrical circuit for applying generally the same potential to both the sensing electrode and the shielding electrode to establish an electrically neutral zone between the sensing and shielding electrodes and thereby reduce the effect of a conductive buildup of material on the probe. These conventional systems are capable of automatically compensating for small conductive buildups of material on the probe; however, under certain conditions, the conductivity of the buildup may be so great that the control circuit can no longer maintain the same potentials on the sensing and shielding electrodes. Accordingly, when highly conductive buildup of material occurs, the neutrality of the electrical field between the sensing electrode and the shielding electrode is eliminated and the capacity level sensor system must be deactivated so that it can be manually recalibrated to compensate for the high conductivity buildup of material on the probe. This compensation is usually accomplished by manually adjusting a variable capacitor in a capacitance bridge circuit which includes the capacitance established between the sensing electrode and the conductive member.

It is one object of the present invention to provide a capacitive level sensor control system which automatically compensates for a relatively high conductive buildup of material on the sensor probe by continuously measuring an electrical characteristic of the shielding electrode which is related to the conductivity of the material buildup on the probe and through a feedback loop automatically tuning the oscillator circuit of the system to adjust the sensitivity of the system.

According to the present invention, a capacitive system for sensing the level of material includes a conductive member electrically connected to ground potential, a probe including a sensing electrode arranged to establish a capacitance between the sensing electrode and the conductive member which is determined by the level of the material and a shielding electrode interposed between the conductive member and the sensing electrode to form an electrically neutral zone therebetween to thereby reduce the effect of a conductive buildup of the material on the probe on the capacitance between the conductive member and the sensing electrode, a first circuit electrically connected to the sensing and shielding electrodes for applying generally the same electrical potential to both the sensing and shielding electrodes, the first circuit having an output which varies in response to a change in the capacitance between the conductive member and the sensing electrode, means for sensing an electrical characteristic of the shielding electrode which is related to the conductivity of the buildup of material on the probe, and a second circuit electrically interconnecting the sensing means and the first circuit for automatically adjusting the sensitivity of the first circuit in response to changes in the electrical characteristic to compensate for a highly conductive buildup of material on the probe.

In one illustrative embodiment of the control system of the present invention, the sensed electrical characteristic of the shielding electrode, is the current supplied to the shielding electrode. This sensed current is amplified and rectified to control the voltage of a variable capacitance (varactor) diode to automatically tune the oscillator circuit of the control system. In response to an increase in the conductivity of buildup of material on the probe, the current supplied to the shielding electrode controls the feedback of the oscillator circuit and adjusts the sensitivity of the control system so that the system always operates with a maximum sensitivity even when the conductivity of the buildup of material on the probe is relatively high.

Further, according to the present invention, a method of controlling a capacitive level sensor to automatically compensate for conductive buildups of material on a probe which includes a sensing electrode arranged to establish a capacitance with a grounded conductive member and a shielding electrode interposed between the conductive member and the sensing electrode to form an electrically neutral zone therebetween includes the steps of applying generally the same electrical potential to both the sensing and shielding electrodes to establish the electrically neutral zone and thereby reduce the effect of the conductive buildup of material on the probe, sensing an electrical characteristic of the shielding electrode which is related to the conductivity of the buildup of material on the probe, and employing the sensed electrical characteristic in a feedback loop to adjust the sensitivity of the circuitry of the system in response to changes in the electrical characteristic and thereby compensate for highly conductive buildups of material on the probe by maintaining the neutrality of the zone between the sensing electrode and conductive member.

Figure 2:
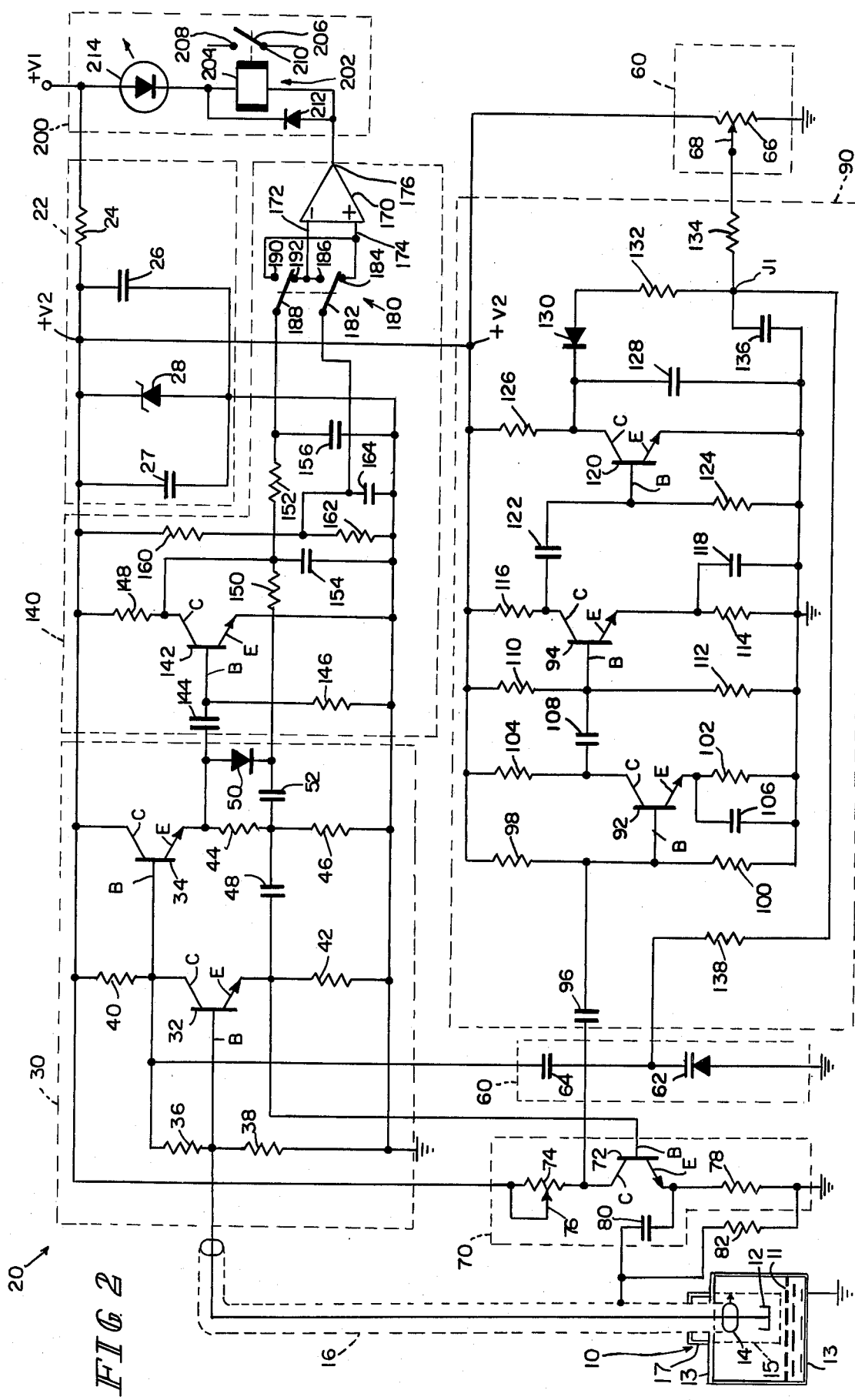

Various other features and advantages of the present invention will become apparent in view of the following detailed description of one embodiment thereof, which description should be viewed in conjunction with the accompanying drawings, in which:

FIG. 1 is a functional block diagram of a capacitive level sensor control system according to the present invention; and FIG. 2 is a schematic circuit diagram of the control system illustrated in FIG. 1.

Referring now to FIGS. 1 and 2, a capacitive level sensor employed in the system of the present invention may be any capacitive level sensor well known in the art having a conductive member, a sensing electrode, and a shielding electrode interposed therebetween, such as one of the capacitive level sensors disclosed in the aforementioned United States patents. As diagrammatically illustrated in FIGS. 1 and 2, the capacitive level sensor includes a probe 10 which, in the illustrative embodiment, is constructed of a non-conductive material 15 having a high chemical resistivity. The probe 10 is arranged within a container 13 so that a capacitance is established between a sensing electrode 12 located in the tip of the probe 10 and a grounded conductive member such as the mounting gland 17 for the probe 10 or the sides of the container 13. As shown in FIG. 2, the mounting gland 17 is connected to the grounded container 13. The capacitance between the sensing electrode 12 and the conductive member is variable in accordance with the level of the material 11 within the container 13. The sensing electrode 12 is molded into the tip of the probe 10 so that it is both physically and electrically isolated from the material 11 in the container 13. This technique of using a capacitance to detect the level of a material 11 wherein a probe 10 forms one plate of a capacitor while the container wall 13 or other grounded conductive member forms the second plate of a capacitor is generally well known to those skilled in the art of capacitive level sensors. When the material 11 being detected is positioned in proximity to the sensing electrode 12, the capacitance between the sensing electrode 12 and the conductive member changes and a circuit detects such change to provide an indication of the level of the material 11 within the container 13.

One of the problems heretofore associated with these conventional capacitive level sensors is that conductive materials have a tendency to adhere to and build up on the probe 10 and create parasitic current paths between the sensing electrode 12 and the conductive member. This conductive buildup of material on the probe 10 therefore produces an inaccurate indication of the level of the material 11 within the container 13.

As disclosed in the aforementioned United States patents, the failure problem due to conductive buildup of material on the probe 10 has been reduced by interposing a shielding electrode 14 in the probe 10 between the sensing electrode 12 and the conductive member and applying a signal to both the sensing electrode 12 and the shielding electrode 14 having generally the same electrical potential to establish an electrically neutral zone between the sensing electrode 12 and the conductive member. Whereas the sensing electrode 12 is isolated from the material 11 being measured, the shielding electrode 14 must be capable of electrically contacting the sensed material 11 (this is indicated by the solid arrow in FIG. 2 which shows an extension of the shielding electrode 14 to the outer surface of the probe 10) in order to achieve the desired result of establishing an electrically neutral zone between the sensing electrode 12 and the conductive member for buildups of material within a limited range of conductivity.

A further improvement which has been used to reduce the failure of these conventional capacitive level sensors is a shielded, coaxial cable 16 connecting the circuitry to the sensing electrode 12. The shielded cable 16 is electrically connected to the shielding electrode 14 and both, therefore, have a signal applied thereto, having generally the same potential as the signal applied to the sensing electrode 12 to establish the zone of electrical neutrality.

These prior systems using a probe 10 with a sensing electrode 12 and shielding electrode 14 have been advantageously used to eliminate inaccurate readings of the material 11 level within a container 13 where the buildup of material on the probe 10 has been within a limited range of conductivity. However, where the buildup of material on the probe 10 reaches a conductivity in excess of the limited range of conductivity, a higher parasitic current is developed between the sensing electrode 12 and the conductive member which results in inaccurate readings by even those systems which use the shielding electrode 14. Accordingly, for a buildup of material having a relatively high conductivity, it is still necessary in those systems represented by the aforementioned United States patents to deactivate the entire system and perform a manual readjustment or recalibration of the system to compensate for the high conductivity of the buildup of material on the probe 10. The sensitivity of the system must therefore periodically be manually readjusted to assure an accurate indication of the material level within the container. Furthermore, as the conductivity of the material buildup on the probe 10 increases, the reliability of the measurement of the material level made by the system decreases until such time as the system sensitivity is again manually readjusted.

Continuing to refer to FIGS. 1 and 2, the control system 20 of the present invention has the capability of automatically compensating for the effects of parasitic currents between the sensing electrode 12 and the conductive member which are created by a highly conductive buildup of material on a probe 10, such as the one described above, by employing a feedback loop to continuously adjust the sensitivity of the system 20 in relation to the conductivity of the buildup of material so that the system 20 continuously operates at generally its maximum sensitivity to produce continuous accurate readings of the level of material within the container without manually adjusting the system once it has been initially calibrated.

Referring particularly to FIG. 1, the control system 20 includes a power supply 22, a first circuit means including an oscillator circuit 30 for applying an electrical potential to the sensing electrode 12 of the probe 10 and for also detecting a change in the capacitance between the sensing electrode 12 and the conductive member and an impedance amplifier circuit 70 electrically connected to the oscillator circuit 30 for applying an amplified signal to the shielding electrode 14 and the shielded cable 16 having generally the same potential as the signal applied to the sensing electrode 12, a second circuit means includig an oscillator tuner 60 electrically connected to the oscillator circuit 30 for calibrating the sensitivity of the circuit 30 and a compensation circuit 90 electrically connected to the impedance amplifier circuit 70 and responsive to a change in an electrical characteristic of the shielding electrode 14 to provide a feedback signal to the oscillator circuit 30 and thereby adjust the sensitivity of the system 20, and a function control circuit 140 electrically connected to an output of the oscillator circuit 30 for controlling various signalling and switching functions 200 in response to changes in the capacitance between the sensing electrode 12 and the conductive member to provide visual and other outputs indicative of the material level within a container.

Referring more particularly to FIG. 2, the power supply 22 may include any conventional means for supplying a first DC voltage (+V1) of 25 volts to drive the signalling and switching functions 200 of the system 20 and further includes a resistor 24, a capacitor 26, and zener diode 28 electrically connected in a conventional manner to produce a second DC voltage (+V2) of approximately 10 volts to drive the remaining circuits 30, 70, 90, and 140 of the control system 20.

Continuing to refer to FIG. 2, the oscillator circuit 30 is a tuned, high-frequency, emitter-coupled, astable multivibrator. In general, the oscillator circuit 30 may include any conventional, astable multivibrator. In the illustrative embodiment of the oscillator circuit 30, two bipolar switching devices 32, 34, such as NPN transistors, each having a base B, collector C, and emitter E, are connected in a generally known configuration to various resistors and capacitors to produce an emitter-coupled astable multivibrator. Resistors 36, 38 are electrically connected between the collector C and base B and base B and ground potential of the transistor 32, respectively, to provide a bias for the base B of the transistor 32. The collector C of transistor 32 is connected to the second regulated DC voltage (+V2) through a resistor 40 and to the base B of the transistor 34. The emitter E of the transistor 32 is connected to ground potential through a resistor 42 and, as will be explained in greater detail later, to the impedance amplifier circuit 70. The transistor 34 has its collector C electrically connected to the second regulated DC voltage (+V2) and its emitter E electrically connected to ground potential through a series of resistor 44, 46. The emitter E of transistor 32 is electrically connected by a capacitor 48 to the junction of resistors 44, 46 to cause the circuit 30 to oscillate. The emitter E of the transistor 34 also represents the output of the oscillator circuit 30 which varies in accordance with a change in capacitance between the sensing electrode 12 and the conductive member as the level of material in the container changes and is therefore electrically connected to the function control circuit 140.

Also connected to the emitter E of the transistor 34 in parallel with the resistor 44 is a diode 50 and capacitor 52. When the diode 50 becomes conductive, it causes an increase in the emitter-coupled feedback through capacitors 48 and 52 to thereby cause a corresponding increase in the amplitude of the output of the oscillator 30. This increase in the amplitude of the oscillator circuit 30 is sensed by the function control circuit 140 to thereby activate the signalling and switching functions 200 and indicate the level of the material.

Sensitivity of the oscillator circuit 30 is controlled by the capacitance between the sensing electrode 12 of the probe and the conductive member and by an oscillator tuner 60. The sensing electrode 12 and the oscillator tuner 60 are each electrically connected to the base B of the transistor 32 to control the oscillator circuit 30 and adjust the sensitivity of the oscillator 30. The tuner 60 includes a variable capacitance (varactor) diode 62 electrically connected in series with a capacitor 64 between ground potential and the collector C of the transistor 32. The tuner 60 further includes a potentiometer 66 including a wiper 68 which is adjustable to adjust the reverse voltage of the variable capacitance diode 62.

With the probe 10 uncovered by the material and located in air (for calibration in air), the wiper 68 of the potentiometer 66 is adjusted to initially calibrate the oscillator circuit 30 by tuning it so that it almost begins to oscillate. In adjusting the potentiometer 66 to initially tune or calibrate the oscillator circuit 30 for maximum sensitivity, the capacitance of the variable capacitance diode 62 is set at a value slightly greater than the capacitance of the probe 10 between the sensing electrode 12 and the conductive member when the sensing electrode 12 is in air and no material is present therebetween. As soon as material contacts the probe 10, the capacitance between the sensing electrode 12 and the conductive member begins to increase, thereby causing the capacitance of the probe 10 to be greater than the capacitance initially set for the variable capacitance diode 62 which causes the oscillator circuit 30 to begin to oscillate. The amplitude of the oscillator circuit 30 is increased when the diode 50 becomes conductive to thereby activate the signaling and switching functions 200.

As can therefore be seen, the tuned capacitance of the variable capacitance diode 62 establishes a switching point for the operation of the oscillator circuit 30. When the capacitance of the probe 10 is less than the capacitance of the variable capacitance diode 62, the oscillator circuit 30 does not oscillate; but when the capacitance of the probe 10 is greater than the capacitance of the variable capacitance diode 62, the oscillator circuit 30 begins to oscillate and provides a signal to the function control circuit 140 to thereby activate the signalling and switching functions 200 and indicate the level of the material within a container.

When the oscillator circuit 30 begins to oscillate, it simultaneously activates the impedance amplifier 70 through the emitter E of the transistor 32 of the oscillator circuit 30. The impedance amplifier circuit 70 amplifies the signal from the oscillator circuit 30 to provide a signal to the shielding electrode 14 of the probe 10 which is equal in phase and amplitude to the signal applied to the probe 10 (sensing electrode 12).

The impedance amplifier circuit 70 includes a bipolar switching device 72 which, in the illustrative embodiment, is an NPN transistor having its base B electrically connected to the emitter E of transistor 32 of the oscillator circuit 30, its collector C connected to the second regulated DC voltage (+V2) of the power supply 22 through a potentiometer 74 having an adjustable wiper 76, and its emitter E connected to ground potential through a resistor 78. The collector C of the transistor 72 is also electrically connected to the compensation circuit 90 to provide the necessary feedback to tune the oscillator circuit 30 in response to a conductive buildup of material on the probe 10. The emitter E of the transistor 72 is also electrically connected through a capacitor 80 to the shielding electrode 14 and the shielded cable 16. The capacitor 80 serves as a DC cutoff device to avoid a DC voltage on the shielding electrode 14 and shield 16 of the probe 10, and a resistor 82 connected between the shielding electrode 14 and ground potential serves to avoid static charges on the probe 10 when the container is being filled with the material. The application of a signal to the shielding electrode 14 of the probe 10 having generally the same potential as the probe 10 signal establishes an electrically neutral field between the sensing electrode 12 of the probe 10 and the conductive member so that a buildup of material on the probe 10 having a conductivity within a limited range does not significantly affect the accuracy and sensitivity of the control system 20. Furthermore, the use of a shielded cable 16 and the application of a signal to the shielded cable 16, having generally the same potential as the probe 10 signal, form an electrically neutral field around the electrical connection between the sensing electrode 12 of the probe 10 and the oscillator circuit 30 to eliminate or reduce any undesirable capacitance between the sensing electrode 12 of the probe 10 and the electronics of the control system 20.

The potentiometer 74 is used to sense and measure an electrical characteristic of the shielding electrode 14. This electrical characteristic is dependent upon and therefore directly related to the conductivity of any buildup of material which occurs on the probe 10. In the illustrative embodiment, the sensed electrical characteristic is the AC current applied to the shielding electrode 14; however, it should be understood that other electrical characteristics of the shielding electrode 14 which have a relationship to the conductivity of the buildup of material could also be sensed without departing from the scope of the present invention. The wiper 76 of the potentiometer 74 may be adjusted to adjust its sensitivity to the conductivity of the particular material being measured. The sensed AC current supplied to the shielding electrode 14 produces a signal which is fed to the compensation circuit 90. By adjusting the wiper 76 of the potentiometer 74, the voltage on the collector C of the transistor 72 is set. As the AC current applied to the shielding electrode 14 through the transistor 72 increases due to an increase in the magnitude of the oscillations of oscillator circuit 30, the voltage on the shielding electrode 14 also increases. Correspondingly, the voltage on the collector C of transistor 72 increases to produce a signal which is fed to the compensation circuit 90.

The signal representing the sensed electrical characteristic of the shielding electrode 14 is fed through a two-stage amplifier in the compensation circuit 90 having an aggregate gain of approximately 600. The two-stage amplifier includes two bipolar switching devices 92, 94 which, in the illustrative embodiment, are two NPN transistors electrically coupled in a common emitter configuration. The signal representing the electrical characteristic of the shielding electrode 14 is first passed through a capacitor 96 which serves as a DC filter to block any DC components of the signal from the impedance amplifier circuit 70. The two transistors 92, 94 include bases B, collectors C, and emitters E which are electrically coupled to various resistors and capacitors in a conventional, common emitter configuration. Resistors 98, 100 provide the bias for the base B of transistor 92. The emitter E of transistor 92 is electrically connected to ground potential through the parallel combination of a bias resistor 102 and bypass capacitor 106. The bypass capacitor 106 prevents any loss of amplification due to negative feedback in the amplifier circuit. The collector C is electrically connected to the second regulated DC voltage (+V2) of the power supply 22 through a resistor 104 and through a second blocking capacitor 108 to the base B of the transistor 94. Resistors 110, 112 bias the base B of transistor 94 and the emitter E of transistor 94 is electrically connected to ground potential through the parallel combination of a bias resistor 114 and a bypass capacitor 118 which perform the same functions as the resistor 102 and capacitor 106 electrically connected to the emitter E of transistor 92. The collector C of the transistor 94 is connected through a resistor 116 to the second regulated DC voltage (+V2) of the power supply 22 and to the base B of another bipolar switching device 120 through a third blocking capacitor 122.

In the illustrative embodiment, the bipolar switching device 120 is an NPN transistor which is used to rectify the amplified signal representing the electrical characteristic of the shielding electrode 14 sensed by the potentiometer 74 of the impedance amplifier circuit 70. Resistor 124 connected to the base B of transistor 120 serves to bias the base B of transistor 120. The emitter E of the transistor 120 is electrically connected to ground potential and the collector C of transistor 120 is electrically connected to the second regulated voltage (+V2) of the power supply 22 through a resistor 126. The collector C of the transistor 120 is also electrically connected to a capacitor 128 which is connected to ground potential in parallel with the collector C and emitter E of the transistor 120 to provide further rectification and filtering of the amplified signal representing the electrical characteristic of the shielding electrode 14 of the probe 10.

The collector C of the transistor 120 is further electrically connected through a forward biased diode 130 and a resistor 132 to a circuit junction J1. Junction J1 is electrically connected through a resistor 134 to the adjustable wiper 68 of the potentiometer 66 of the tuner 60 and, in the illustrative embodiment, initially has a voltage of +V3 set by the adjustment of the wiper 68 of the potentiometer 66 when the probe 10 is initially in air. The junction J1 is also electrically connected to ground potential through a capacitance 136 and further electrically connected in a feedback loop through resistor 138 to the variable capacitance diode 62 so that the voltage of the variable capacitance diode 62 is controlled by the voltage at junction J1 to thereby adjust the sensitivity of the oscillator circuit 30 and tune the control system 20 in response to changes in the conductivity of the material buildup on the probe 10.

In operation, as soon as the sensed current applied to the shielding electrode 14 of the probe 10 exceeds a predetermined value set by the adjustable wiper 76 of the potentiometer 74, the transistor 120 begins to conduct to thereby reduce the voltage at junction J1 through the diode 130 and resistor 132. An increase in the current applied to the shielding electrode 14 occurs as the conductivity of the material buildup on the probe 10 also increases. Furthermore, as the conductivity of the material buildup increases, the parasitic currents between the sensing element electrode 12 and the conductive member also increase, thereby causing an increase in the capacitance established between the sensing electrode 12 and the conductive member which is misrepresentative of the level of material being measured. Accordingly, in order to adjust the sensitivity of the oscillator circuit 30 and thereby tune the control system 20 so that the capacitance between the sensing electrode 12 and the conductive member accurately represents the level of the material being measured, the capacitance of the variable capacitance diode 62 must also be increased so that it remains slightly greater than the capacitance between the sensing electrode 12 and the conductive member in the absence of any material.

As the voltage at junction J1 is reduced in response to the amplified signal representing the electrical characteristic of the shielding electrode 14, the capacitance of the variable capacitance diode 62 is increased through the feedback loop between junction J1 and the tuner 60 to thereby adjust the sensitivity of the oscillator circuit 30 by assuring maximum feedback conditions on the base B of transistor 32 and tune the control system 20 so that the signalling and switching functions 200 accurately represent the level of the measured material. It can, therefore, be appreciated from the above description that, in response to a change in conductivity of the material buildup on the probe 10, the current supplied to the shielding electrode 14 of the probe 10 changes, is sensed, and fed through a compensation circuit 90 to control the feedback of the oscillator circuit 30 and thereby shift the sensitivity of the circuit 30 so that the control system 20 operates at generally maximum sensitivity at all times even when the conductivity of the material buildup on the probe 10 is relatively high and, therefore, greater than the limited conductivity presently compensated for by conventional control systems.

Continuing to refer to FIG. 2, the function control circuit 140 includes a bipolar switching device 142 which, in the illustrative embodiment, is an NPN transistor. The base B of the transistor 142 is electrically connected to the output of the oscillator circuit 30 through a blocking capacitor 144. The base B is further biased by a resistor 146. The emitter E of the transistor 142 is electrically connected to ground potential and the collector C is electrically connected to the second regulated DC voltage (+V2) of the power supply 22 through a resistor 148. When the oscillator circuit 30 starts oscillating, the amplitude of the oscillations increases until the transistor 142 becomes conductive. This reduces the potential of the collector C of transistor 142. As soon as the potential of the collector C of transistor 142 drops below approximately five volts, diode 50 becomes conductive and shorts out resistor 44. The amplitude of the oscillations of circuit 30 is immediately increased and this increase is sensed by the remainder of the functional control circuit 140.

The collector C of the transistor 142 is further connected to two low-pass RC circuits which include resistors 150, 152 and shunt capacitors 154, 156.

Further included in the function control circuit 140 is a voltage divider network including resistors 160, 162 electrically connected between the second regulated DC voltage (+V2) of the power supply 22 and ground potential. A shunt capacitance 164 is electrically connected in parallel with the resistor 162. At the output of the function control circuit 140, is an operational amplifier 170 which could be any conventional, operational amplifier. In the illustrative embodiment, the operational amplifier is either one manufactured by National Semiconductor Corporation and identified as LM358 or one manufactured by Siemens Corporation and identified as TAA761. The amplifier 170 has an inverting input terminal 172, a non-inverting input terminal 174, and an output terminal 176.

The two input terminals 172, 174 of the amplifier 170 are connected to a double-pole, single-throw switch 180 which includes a first movable contact 182. The contact 182 is electrically connected on one side to the junction between resistors 160, 162 of the voltage divider network and is movable to engage a terminal 184 electrically connected to the non-inverting input terminal 174 of the amplifier 170 or a terminal 186 electrically connected to the inverting input terminal 172 of the amplifier 170. Also included in the switch 180 and simultaneously movable with the movable contact 182 is a second movable contact 188. The contact 188 is electrically connected on one side to resistor 152 and is movable between a terminal 190 electrically connected to the non-inverting input terminal 174 of the amplifier 170 and a terminal 192 electrically connected to the inverting input terminal 172 of the amplifier 170. Depending upon the position of the movable contacts 182, 188, either the inverting input terminal 172 or the non-inverting input terminal 174 of the amplifier 170 will be electrically connected to the junction between resistors 160, 162 in order to establish a threshold voltage for comparison to the voltage on the other terminal 172 or 174 which represents the output of the oscillator circuit 30.

In the illustrative embodiment, the movable contact 182 electrically connects the terminal 184 to the junction between resistors 160, 162; and therefore, the threshold voltage for the operation of the amplifier 170 is applied to the non-inverting terminal 174. Correspondingly, the movable contact 188 electrically connects the output of the oscillator circuit 30 through the various circuit elements previously described to the terminal 192; and therefore, the output of oscillator circuit 30 is applied to the inverting input terminal 172 of the amplifier 170. With the movable contacts 182, 188 positioned as illustrated in FIG. 2, when the oscillator circuit 30 is oscillating and the output thereof is applied to the inverting input terminal 172, the signal at the output terminal 176 of the amplifier 170 goes high to control the operation of the various signalling and switching functions 200. Furthermore, when the oscillator circuit 30 is not oscillating and therefore provides no output signal, the signal at the output terminal 176 of the amplifier 170 goes low to control the operation of the signalling and switching functions 200 (maximum fail safe mode).

If the movable contacts 182, 188 are moved so that the reference voltage is applied to the inverting input terminal 172 through terminal 186 and the output of oscillator circuit 30 is applied to the non-inverting input terminal 174 through terminal 190, then when the oscillator circuit 30 oscillates, the signal at the output terminal 176 of the amplifier 170 goes low to control the operation of the signalling and switching functions 200. As long as the oscillator circuit 30 does not oscillate, the signal at the output terminal 176 of the amplifier 170 remains high to control the signalling and switching functions 200 (minimum fail safe mode).

Continuing to refer to FIG. 2, the signalling and switching functions 200 may include any conventional devices for visually and/or audibly indicating the level of the material and/or switching device for controlling the operation of ancillary equipment or functions. In the illustrative embodiment, the switching function is performed by a bidirectional switching device 202 such as an electromechanical relay which includes a solenoid 204, a movable contact 206, and terminals 208, 210. The movable contact 206 may be either normally closed or normally open as illustrated in FIG. 2, so that, in response to the signal at the output terminal 176 of the amplifier 170, the movable contact either opens or closes the terminals 208, 210, respectively. Connected across the electrical input terminals of the relay 202 is a damper diode 212. Further, connected in series with the relay and providing a visual signal to indicate the level of the material is a light-emitting diode 214. As can best be seen in FIG. 2, the signalling and switching functions 200 are connected to the first DC voltage (+V1) of the power supply 22.

The operation of the control system 20 can best be described by referring to FIG. 2. Initially, with the probe 10 in air, the system 20 is calibrated or tuned by adjusting the wiper 68 of the potentiometer 66 so that the capacitance of the variable capacitance diode 62 is slightly greater than the capacitance between the sensing electrode 12 and the conductive member in the absence of any material. This is done by controlling the voltage of the variable capacitance diode 62 so that there are no oscillations in the oscillator circuit 30. As soon as the capacitance between the sensing electrode 12 and the conductive member increases due to the close proximity or presence of material relative to the probe 10, the oscillator circuit 30 begins to oscillate. The amplitude of the signal produced by the oscillator circuit 30 increases and is used to control the operation of the signalling and switching functions 200 through the function control circuit 140. Simultaneously, with the oscillation of oscillator circuit 30, the oscillator circuit 30 signal activates the impedance amplifier circuit 70 which supplies a current to the shielding electrode 14 and shielded cable 16 to produce the electrically neutral field between the sensing electrode 12 and the conductive member. The current supplied to the shielding electrode 14 is sensed and measured by the potentiometer 74 of the impedance amplifier circuit 70. The potentiometer 74 has been adjusted so that when the current through collector C of transistor 72 increases above the set collector C current to represent an increase in the AC current applied to the shielding electrode 14, a signal is applied to the compensation circuit 90 wherein it is amplified and rectified. As the current sensed by the variable potentiometer 74 continues to increase, thereby indicating a highly conductive buildup of material on the probe 10, the voltage at junction J1 initially set by the adjustment of the wiper 68 of the potentiometer 66 is correspondingly decreased through the diode 130 and resistor 132. As the voltage at junction J1 is decreased, the capacitance of the variable capacitance diode 62 is increased so that it always remains slightly greater than the capacitance which would exist between the sensing electrode 12 and the conductive member if the probe 10 were placed in air.

The current supplied to the shielding electrode 14 is dependent on, and related to, the conductivity of the buildup of material on the probe 10. This current is used in conjunction with a feedback loop to control the voltage of the variable capacitance diode 62 of the tuning circuit 60 which thereby adjusts and tunes the control system 20 to compensate for a highly conductive buildup of material on the probe 10. It can therefore be appreciated that since the sensitivity of the control system 20 is continuously being adjusted in response to changes in the current supplied to the shielding electrode 14 and the conductivity of the buildup of material between the sensing electrode 12 and the conductive member, the control system 20 always operates at maximum sensitivity even when there is a highly conductive buildup of material on the probe 10.

What is claimed is:

1. In a control system for a capacitive level sensor of the type which includes a probe having a sensing element arranged therein to establish a capacitance between the sensing element and a grounded conductive member which changes in response to the presence of a material, a shielding element interposed between the sensing element and the conductive member, and a first circuit for applying generally the same electrical potential to both the sensing element and the shielding element to establish an electrically neutral field between the sensing element and the conductive member and thereby reduce the effect of a conductive buildup of material on the probe within a limited range of conductivity, the improvement which comprises a means for sensing an electrical characteristic of the shielding element which is related to the conductivity of the buildup of material on the probe and a second circuit electrically connecting the sensing means to the first circuit for automatically adjusting the sensitivity of the first circuit in response to changes in the electrical characteristic to compensate for buildup of the material having a conductivity both within and outside the limited range of conductivity.

2. The system as recited in claim 1 wherein the second circuit includes a variable circuit means for calibrating and tuning the first circuit.

3. The system as recited in claim 2 wherein the variable circuit means includes a first variable circuit component having an electrical characteristic which is controlled in response to changes in the electrical characteristic of the shielding element to adjust the sensitivity of the first circuit.

4. The system as recited in claim 3 wherein the controlled electrical characteristic of the first circuit component is capacitance and the second circuit includes means for maintaining the capacitance of the first circuit component greater than the capacitance between the sensing element and the conductive member in the absence of the material.

5. The system as recited in claim 4 wherein the first circuit component is a variable capacitance diode.

6. The system as recited in claim 4 wherein the variable circuit means further includes a second circuit component for initially establishing the capacitance of the first circuit component greater than the capacitance between the sensing element and the conductive member in the absence of the material.

7. The system as recited in claim 6 wherein the second circuit includes a junction having a variable voltage and electrically connected to the first and second circuit components, the variable voltage initially being set by adjusting the second circuit component to establish the value of the capacitance of the first circuit component greater than the capacitance between the sensing element and the conductive member in the absence of material, and the voltage thereafter being variably determined in response to changes in the electrical characteristic of the shielding element sensed to maintain the value of the capacitance of the first circuit component above the capacitance between the sensing element and the conductive member in the absence of material.

8. The system as recited in claim 7 wherein the second variable circuit component is a potentiometer.

9. In combination, a capacitive sensor for detecting the level of a material, comprising a sensing element arranged to form a capacitance with a grounded conductive member, which changes in response to the presence of the material in proximity thereto, a shielding element interposed between the sensing element and the conductive member to establish an electrically neutral field therebetween and thereby reduce the effect of a conductive buildup of the material between the sensing element and the conductive member, and a system for controlling the operation of the sensor including an oscillator circuit electrically connected to the sensing element and having an output which varies in response to changes in the capacitance between the sensing element and the conductive member to indicate the level of the material, means electrically connected to the oscillator circuit for tuning the control system, an amplifier circuit electrically interconnecting the oscillator circuit and the shielding element to produce corresponding potentials on the sensing and shielding elements, means for sensing an electrical characteristic of the shielding element which is related to the conductivity of the material buildup between the sensing element and conductive member, and a compensation circuit responsive to the electrical characteristic of the shielding element and electrically connected to the tuning means to automatically adjust the sensitivity of the system and thereby compensate for the material buildup.

10. A capacitive system for sensing the level of materials, comprising a conductive member electrically connected to ground potential, a probe including a sensing electrode arranged to establish a reactance between the sensing electrode and conductive member, the value of which is determined by the level of the material, and a shielding electrode interposed between the conductive member and the sensing electrode to form an electrically neutral zone between the sensing electrode and conductive member and thereby reduce the effect of a conductive buildup of the material on the probe on the reactance between the conductive member and the sensing electrode, a first circuit electrically coupled to the sensing and shielding electrodes for applying generally the same electrical potential to the sensing and shielding electrodes, the first circuit having an output which varies in response to changes in the reactance between the conductive member and the sensing electrode means for sensing an electrical characteristic of the shielding electrode which is related to the conductivity of the buildup of material on the probe, and a second circuit electrically interconnecting the sensing means and the first circuit for automatically adjusting the sensitivity of the first circuit in response to changes in the electrical characteristic to compensate for a highly conductive buildup of the material on the probe.

11. A method of controlling a capacitive level sensor to automatically compensate for conductive buildups of material on a probe wherein the sensor includes a sensing electrode arranged in the probe to establish a capacitance with a grounded conductive member, circuitry for detecting changes in the capacitance in response to changes in the level of the material, and a shielding electrode interposed between the conductive member and the sensing electrode to form an electrically neutral zone therebetween, comprising the steps of applying corresponding electrical potentials to both the sensing and shielding electrodes to establish the electrically neutral zone and thereby reduce the effect of the conductive buildup of material on the probe between the sensing electrode and conductive member, sensing an electrical characteristic of the shielding electrode which is related to the conductivity of the buildup of material on the probe, and employing the sensed electrical characteristic in a feedback loop to the circuitry to maintain the neutrality of the zone between the sensing electrode and conductive member by automatically adjusting the sensitivity of the circuitry in response to changes in the electrical characteristic.

12. The method as recited in claim 11 wherein the sensed electrical characteristic is employed to vary a predetermined reactance of a variable circuit means for tuning the circuitry included in the feedback loop and thereby adjust a predetermined switching point of the circuitry for detecting changes in the capacitance between the sensing electrode and conductive member.

13. The method as recited in claim 12 wherein the predetermined reactance of the variable circuit means is varied by varying the voltage associated therewith in response to changes in the sensed electrical characteristic of the shielding electrode.

* * * * *